Dec. 26, 1944.  L. E. JONES  2,365,822
TRANSVERSE SIZER
Filed March 4, 1943   5 Sheets-Sheet 2
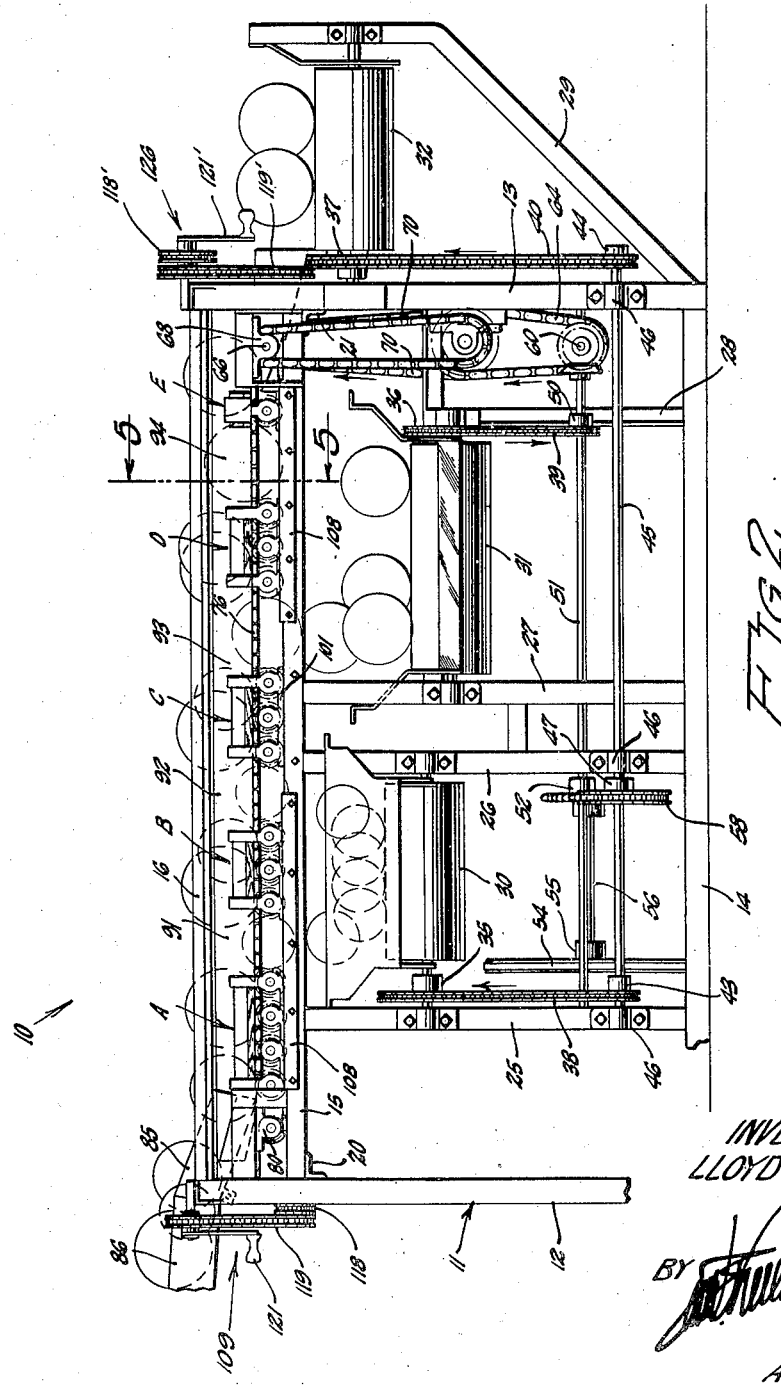
FIG. 2
INVENTOR:
LLOYD E. JONES
BY 
ATTORNEY

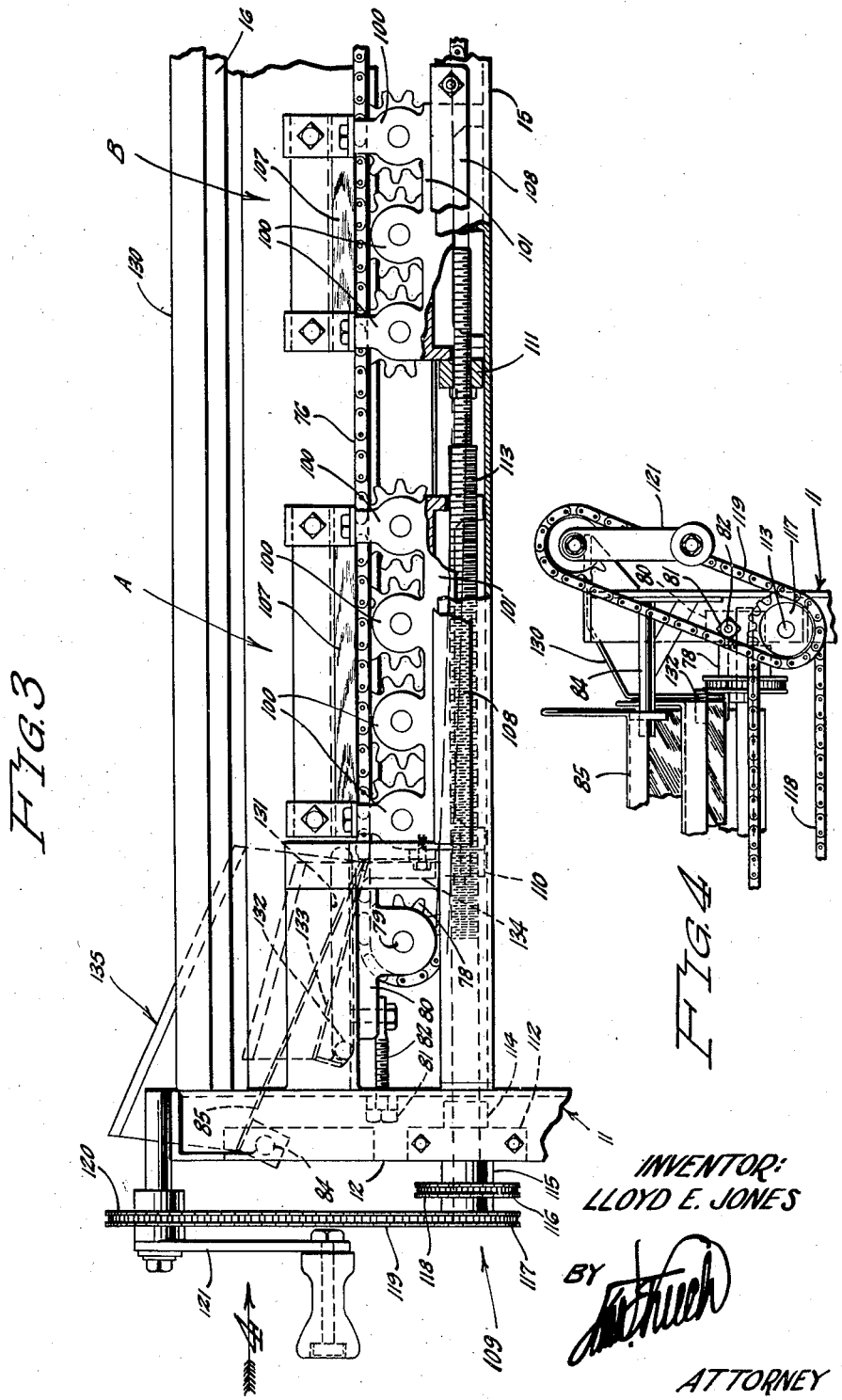

Dec. 26, 1944.   L. E. JONES   2,365,822
TRANSVERSE SIZER
Filed March 4, 1943   5 Sheets-Sheet 4
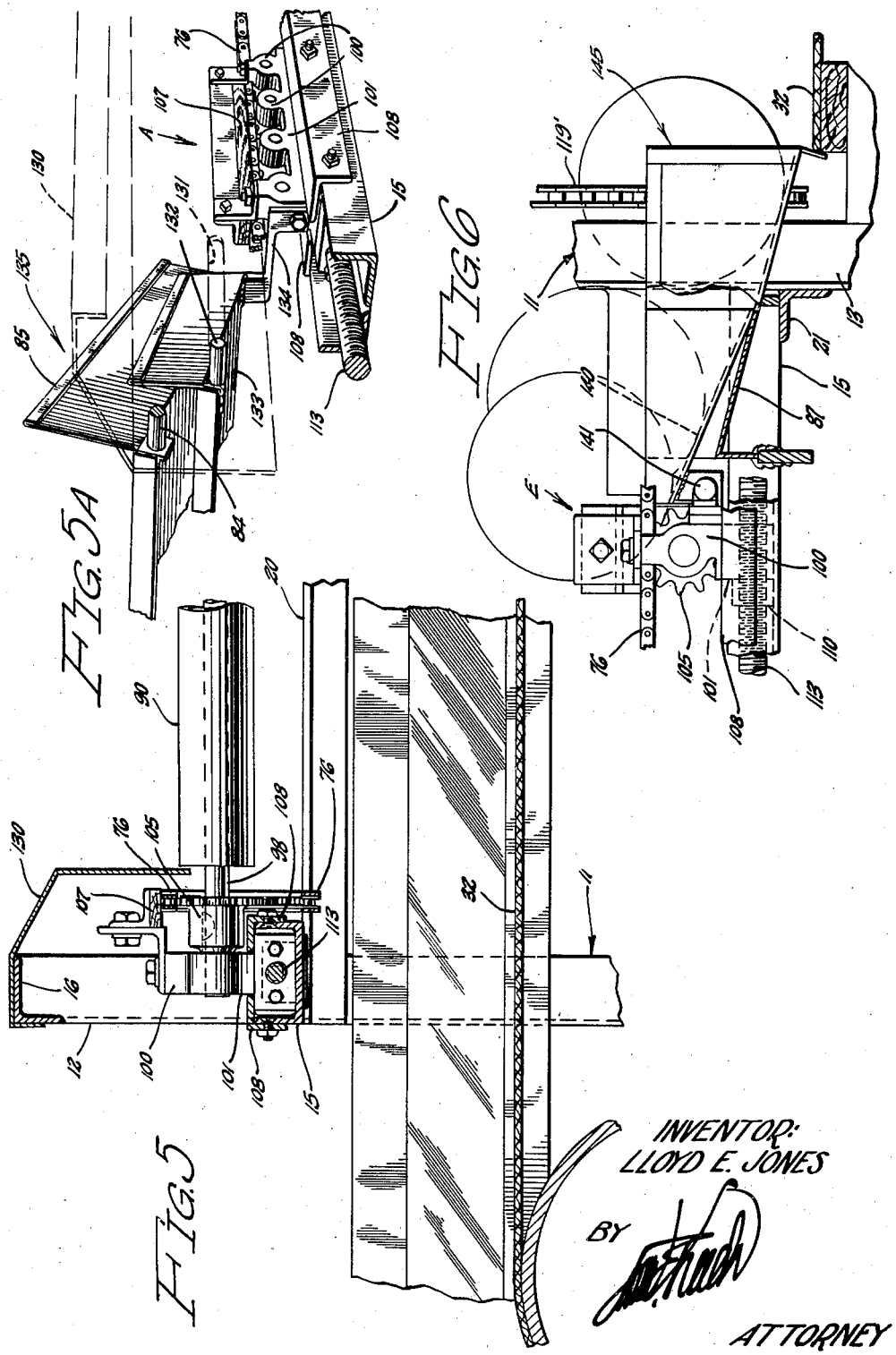
INVENTOR:
LLOYD E. JONES
BY
ATTORNEY Patented Dec. 26, 1944

2,365,822

UNITED STATES PATENT OFFICE 2,365,822

TRANSVERSE SIZER

Lloyd E. Jones, Pasadena, Calif., assignor to Food Machinery Corporation, San Jose, Calif., a corporation of Delaware Application March 4, 1943, Serial No. 477,929

11 Claims. (Cl. 209—106)

This invention relates to the segregation of rollable objects in accordance with their minimum diameters and, being particularly useful in the sizing of citrus fruits such as oranges and grapefruit, will be described herein as when so used.

With the advent of canning oranges and grapefruit it has become desirable to divert from the commercial operations in packing these fruits, certain off sizes of fruit for which there is less demand on the market, and send these sizes to the cannery.

It is accordingly an object of my invention to provide a sizer which will handle a relatively large flow of fruit, and which will separate from this fruit those pieces within a given range of sizes.

It is a further object of my invention to provide a sizer, as aforesaid, which will also separate the balance of the fruit handled into two or more different size groups.

A further object of my invention is to provide such a sizer which is relatively compact for the volume of fruit it will handle.

Yet another object is to provide such a machine in which it is possible to readily adjust the machine to vary the size groups into which the fruit is segregated.

A yet further object of my invention is to provide a sizer of the transverse roller type, in which the rollers adjacent sizing openings rotate on fixed axes without damaging the fruit, and yet accomplish an accurate segregation of the latter.

It is a still further object of my invention to provide a sizer of the transverse roller type in which rollers on opposite sides of the sizing openings rotate on fixed axes, and in which the fruit is fed through the sizer by progressive action produced by the pressure of the fruit being fed into the machine.

The manner of accomplishing the foregoing objects, as well as further objects and advantages, will be made manifest in the following description taken in connection with the accompanying drawings, in which:

Fig. 2 is a side elevation of Fig. 1.

Fig. 3 is an enlarged fragmentary view of a portion of Fig. 2.

Fig. 4 is a fragmentary end elevational view of Fig. 3.

Fig. 5 is an enlarged fragmentary detail sectional view taken on the line 5—5 of Fig. 2.

Fig. 5A is a fragmentary perspective view illustrating the manner of attaching a delivery board to an initial group of rollers of the invention.

Fig. 6 is an enlarged fragmentary sectional view taken on the line 6—6 of Fig. 1.

Figure 1:
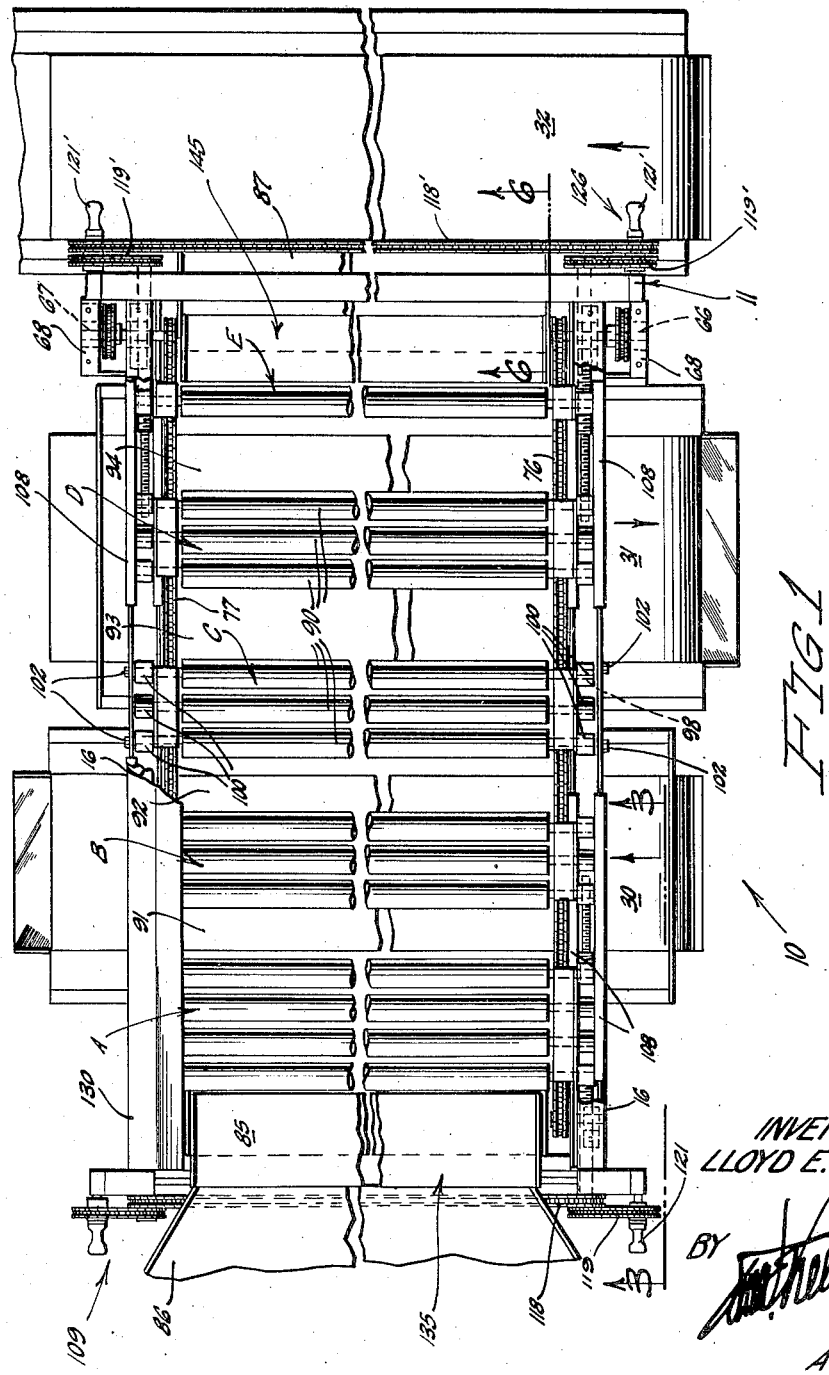
Fig. 1 is a plan view of a preferred embodiment of the sizer of my invention, with portions thereof broken away to illustrate normally hidden portions of the structure.

Referring specifically to the drawings, the sizer 10 shown therein includes a frame 11 including corner angle iron posts 12 and 13 which are joined longitudinally at the lower ends by angle irons 14 and adjacent their upper ends by channels 15 and angle iron stringers 16. The posts 12 and 13 are joined transversely by horizontal angle irons 20 and 21 and the frame 11 is suitably braced longitudinally and transversely by diagonal braces (not shown).

The lower angle irons 14 and channels 15 are joined by upright angles 25, 26, and 27. Auxiliary angle irons 28 and 29 extend upwardly from the base of the frame 11, and suitable fruit-receiving belt conveyors 30, 31 and 32 are mounted on these angles as clearly shown in Figs. 1 and 2. Conveyor 30 has a drive sprocket 35, conveyor 31 a drive sprocket 36, and conveyor 32 a drive sprocket 37. Trained about sprockets 35 and 37 are chains 38 and 40 which also connect respectively to sprockets 43 and 44 provided on a shaft 45, which is journalled in bearings 46 provided on the frame 11, and is driven by a sprocket 47.

Figure 7:
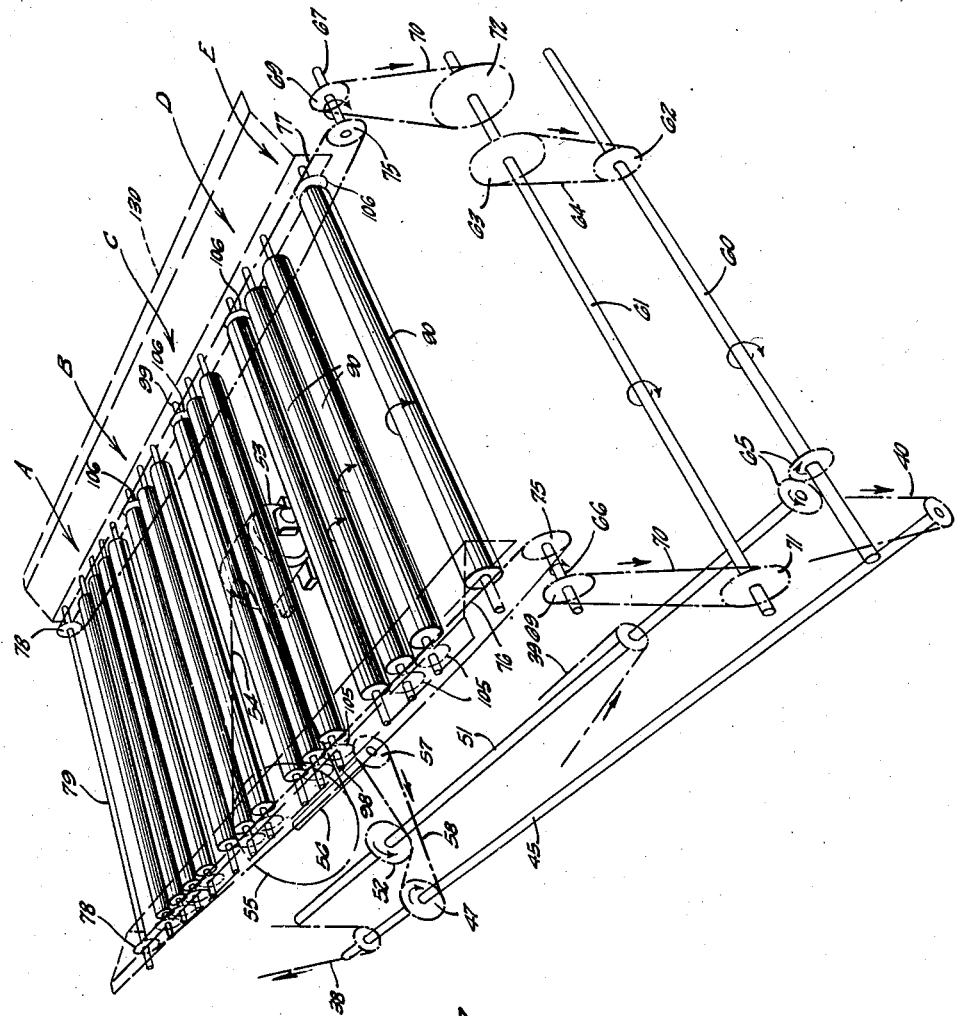
Fig. 7 is a diagrammatic phantom perspective view illustrating the drive mechanism of the invention.

A drive chain 39 for the conveyor 31 connects sprocket 36 with a sprocket 50 mounted on a shaft 51, which is journalled in suitable bearings (not shown) provided on the frame 11 and is driven by a sprocket 52. The sizer 10 is preferably driven by an electric motor 53 connected by a belt 54 (see Fig. 7) to a master sprocket 55 on a countershaft 56 having a pinion sprocket 57 which is connected by a chain 58 to the sprocket 47, chain 58 also meshing externally with the sprocket 52 so that the shaft 51 is driven in a reverse direction from the shaft 45. It is thus seen that the conveyor 31 is driven in an opposite direction from the conveyors 30 and 32.

Journalled in suitable bearings across an end of the frame 11 are countershafts 60 and 61 having sprockets 62 and 63 respectively which are connected by a chain 64. The shaft 60 and shaft 51 are provided with meshing miter gears 65 so that shaft 60 is driven from shaft 51 in the direction indicated.

Short shafts 66 and 67 are journalled in suitable bearings 68 provided on the frame 11, these shafts having sprockets 69 connected by chains 70 to sprockets 71 and 72 on the shaft 61. The sprocket 72 being larger than the sprocket 71, the shaft 67 is rotated at a higher rate of speed than the shaft 66 by rotation of the shaft 61. Shafts 66 and 67 (Figs. 1 and 2) have sprockets 75 which are connected by longitudinal endless chains 76 and 77 to idle sprockets 78 provided on a shaft 79 mounted in horizontally slidable bearing blocks 80 (Figs. 2 and 3) at the opposite end of the machine. The bearing blocks 80 are shiftable horizontally by means of nuts 81 provided on screws 82, as shown in Fig. 3, to keep the chains 76 and 77 taut.

Mounted on pivot pins 84 fixed on the posts 12 is a delivery board 85 which is adapted to receive fruit from a trough 86 (see Fig. 1) for sizing in the sizer 10. At the opposite end of the machine a fixed delivery board 87 is provided for delivering onto the conveyor 32 fruit which has passed through the sizer 10.

Mounted on the channel irons 15 of the machine 10 is a series of groups A, B, C, D and E of rollers 90. These groups of rollers are spaced so that adjacent groups provide sizing openings 91, 92, 93 and 94 (see Fig. 1). The sizing openings 91 and 92 are disposed over the conveyor 30 while the sizing openings 93 and 94 are disposed over the conveyor 31.

There are three rollers in group C, each of these rollers having trunnions 98 and 99 (Fig. 7) at its opposite ends which journal in bearings 100 (Fig. 1) which are formed upon cast bearing bases 101 (Fig. 2). The latter rest centrally in the frame channel 15, and are secured thereto as by cap screws 102 (Fig. 1). As clearly shown in Fig. 7, two of the rollers of group C have sprockets 105 fixed on their trunnions 98, while the other roller 90 of this group has a sprocket 106 fixed on its trunnion 99.

The sprockets 105 and 106 are in alignment with chains 76 and 77, and the upper flights of these chains are held downwardly in mesh with these sprockets by hold-down guides 107 mounted on top of adjacent bearings 100.

The other groups of rollers A, B, D and E have 4 rollers, 3 rollers, 3 rollers, and 1 roller, respectively, and the rollers in each of these groups have trunnions 98 and 99 and are mounted in bearings 100 on bearing bases 101 similarly to the rollers 90 in group C. However, bearing bases 101 on which the rollers 90 are mounted in the roller groups A, B, D and E are slidable longitudinally in the channels 15 and are held against removal from these channels by inner and outer angle guards 108 which are bolted to the channels 15. The initial roller in each of groups B, C and D, as well as the single roller in group E, have sprockets 106 mounted on their trunnions 99, whereas all the balance of the rollers 90 in these groups, as well as all the rollers 90 in group A, have sprockets 105 mounted on their trunnions 98, as clearly shown in Fig. 7.

All the rollers which have sprockets 106 are thus seen to be rotated by the chain 77, while the rollers having sprockets 105 are seen to be rotated by the chain 106. As the chain 77 travels at a higher rate than the chain 76, it is thus clear that the initial roller of each of the groups B, C, D and E which immediatley follows and is adjacent to one of the sizing openings 91, 92, 93 and 94, is rotated in the same direction as but at a higher peripheral speed than the balance of the rollers 90.

The sizing openings are capable of adjustment by shifting roller groups A, B, D and E. This is accomplished for groups A and B by a mechanism 109 (Figs. 1 and 2) which includes nuts 110 and 111 (Fig. 3), bolted onto the bearing bases 100 of roller groups A and B, the nut 110 having internal threads of a pitch 8 to an inch and the nut 111 having threads of a pitch 16 to an inch. Extending through a suitable bearing 112 provided in each of the adjacent corner posts 12, is a threaded feed shaft 113 which is fixed against axial movement by a collar 114 and a collar 115 carrying sprockets 116 and 117 (see Fig. 3). The sprockets 116 on opposite sides of the sizer are connected by a chain 118 and the sprocket 117 is connected by a chain 119 to a sprocket 120 provided on a crank 121 for manually rotating the shafts 113. Thus by manipulation of either crank 121 the roller groups A and B may be shifted longitudinally of the machine, group A being shifted one-eighth of an inch and group B one-sixteenth of an inch in the same direction for each revolution of the feed shafts 113. Thus with each revolution of the feed shafts 113, the sizing openings 91 and 92 are each increased or decreased in width by 1/16 of an inch.

An identical mechanism 126 is provided at the opposite end of the sizer 10 for shifting roller groups D and E to adjust the width of the sizing openings 93 and 94. Parts of the mechanism 126 may be referred to by the same reference numerals applied to corresponding parts of mechanism 109 with prime attached.

To keep fruit on top of the rollers 90 while passing through the sizer 10, guards 130 are mounted on longitudinal angle irons 16 (see Fig. 5). These guards have horizontal slots 131 (Figs. 3 and 5a) near the fruit-receiving end of the sizer 10, into which pins 132 extend, these pins being provided on a longitudinal shiftable delivery board 133 which is fixed by arms 134 to the bearing bases 100 of the roller group A and shifts with this roller group whenever it is moved in adjusting the width of the sizing openings 91 and 92. The delivery board 133 thus cooperates with the delivery board 85 to form a telescopic device 135 for conducting onto the rollers 90 of the roller group A, the fruit delivered to the sizer from the hopper 86.

Similarly, I have provided a longitudinal shiftable delivery board 140 (Fig. 6) which is pivotally mounted by pins 141 on the bearing bases 100 of roller group E, so that whenever this roller group is shifted to adjust the width of the sizer openings 93 and 94, the delivery board 140 cooperates with the delivery board 87 to constitute a telescopic device 145 which insures safe discharge onto the conveyor 32 of fruit passing over the roller 90 of group E.

*Operation*

To start the sizer 10, the motor 53 is energized, which causes all the rollers 90 to be rotated in a uniform direction so that the upwardly disposed surfaces thereof travel in the same direction in which fruit is adapted to travel through the sizer 10, that is from the receiving end where the fruit is received on group A towards the fruit discharge end where the largest fruit is delivered over the roller 90 of group E. As before pointed out, the roller immediately adjacent to and towards the discharge end of the machine from the sizing openings 91, 92, 93 and 94 are all rotated at a slightly faster peripheral speed than the other rollers 90. This insures that no pieces of fruit will get hung up in any of the sizing openings by becoming wedged between rollers forming this opening and continuing to be rotated and pressed between these rollers. In other words, the faster peripheral speed of the roller just forward of each sizing opening continually tends to discharge upwardly from this opening all fruit resting therein. Thus, if fruit is too large to drop downwardly within the space provided in any of these openings, it will remain resting on the two rollers forming this opening until other fruit comes along and contacts the fruit thus resting in the opening. When this happens, the rotation of the piece of fruit resting in this opening will be halted by the oncoming fruit which will cause the opposite roller with the higher peripheral speed to lift this piece of fruit upwardly, whereupon it will be shifted over this roller and on top of the roller group to which this roller belongs.

Previous efforts to make this type of sizer work used only a single large roller located between adjacent sizing openings, and I have found that this does not work, because of the interference between the fruit in one sizing opening with that in the sizing opening just beyond this. I have discovered a solution to this difficulty in making the diameter of the rollers substantially equal to or smaller than the average diameter of the fruit being sized, and then placing a group containing a plurality of rollers between each adjacent pair of sizing openings.

Not only does my invention solve this problem and make this type of sizer practical, but I have provided a means of adjusting the sizing openings which can be actuated while the machine is in operation to give a differential adjustment to these openings at will. The smaller sizes, of course, are taken out of openings 91 and 92, the intermediate sizes are taken out in openings 93 and 94, while the larger sizes are permitted to pass over the roller group E out of the machine and onto the conveyor 32.

It is believed evident that, if desired, a partition may be placed beneath each of the roller groups B and D so as to divide each of the conveyors 30 and 31 into two conveyors and thus segregate into five different size groups the fruit handled by the sizer of my invention.

I claim:

1. In a sizer, the combination of: two groups of transverse rollers disposed in parallel relation, said groups being spaced apart to form a sizing opening; means for rotating the rollers of said groups in a common direction, there being a plurality of rollers in one of said groups and said direction being such that the upper surfaces of the rollers in said group travel toward said sizing opening; means for feeding fruit to be sized onto said last aforementioned group of rollers so that incoming fruit will crowd fruit already resting on said plural group of rollers to cause said fruit thus crowded to drop into said sizing opening, and where said fruit is too large to pass through said sizing opening to engage said large fruit and press it against the roller on the opposite side of said sizing opening, to cause said fruit to be lifted and transferred in said direction over said last mentioned roller; and means for varying the space between said groups of rollers and changing the range of sizes of fruit admitted through said sizing opening, said means being operable while said rollers are rotating, said rollers continuing to rotate about fixed axes during the operation of said machine in between adjustments as aforesaid, the rollers in said plural group being uniformly spaced substantially close together regardless of the changes in width of said sizing opening.

2. In a sizer, the combination of: three groups of transverse cylindrical rollers disposed in parallel relation, said groups being spaced to form two sizing openings disposed between said first and second groups and said second and third groups, said rollers being smaller in diameter than the size of the fruit adapted to pass through said openings; and means for rotating said rollers in a common direction to cause the upper surfaces of said rollers to move in the same direction the fruit travels through said machine, said second group including at least three rollers which are spaced closely together so as to prevent fruit from passing therebetween.

3. In a sizer, the combination of: three groups of transverse cylindrical rollers disposed in parallel relation, said groups being spaced apart to form two sizing openings, each of the first two of said groups having a plurality of said rollers disposed relatively close together so as to allow no fruit to pass downwardly therebetween; means for rotating said rollers in a common direction to cause the upwardly disposed surfaces of said rollers to move in the same direction in which fruit travels through said sizer and to cause the rollers immediately adjacent to and following said sizing openings to be rotated at a higher peripheral rate than the balance of said rollers of each group; and means for shifting two of said groups of rollers relative to the third group of said rollers to simultaneously vary the width of said sizing openings without varying the relative spacing of the rolls within said groups.

4. In a sizer, the combination of: three groups of transverse rollers disposed in parallel relation, said groups being spaced apart to form two sizing openings, each of the first two of said groups having a plurality of said rollers disposed relatively close together; means for rotating said rollers in a common direction to cause the upwardly disposed surfaces of said rollers to move in the same direction in which fruit travels through said sizer and to cause the rollers immediately adjacent to and following said sizing openings to be rotated at a higher peripheral rate than the balance of said rollers of each group; and means for shifting the first and second of said groups at different rates relative to the third of said groups while the latter remains stationary to simultaneously vary the width of said sizing openings.

5. In a sizer, the combination of: a multiplicity of transverse rollers disposed in parallel relation in groups, there being a plurality of rollers in each of the first two of said groups, the rollers of each group being spaced relatively close together, adjacent groups being spaced apart to provide sizing openings, fruit being adapted to flow in a given direction through said sizer across said rollers; means for driving the rollers disposed adjacent to and in said direction from said sizing openings at a given peripheral velocity, said rollers being so driven from one side of said sizer; and means connecting to the other of said rollers at the opposite side of said sizer to rotate said other rollers in the same direction as the aforementioned rollers are rotated at a lesser peripheral velocity; and means for shifting certain of said groups of rollers relative to the other of said groups to vary the width of sizing openings adjacent the groups of rollers so shifted.

6. A combination as in claim 4 in which a telescopic delivery board is provided for delivering fruit to the first group of rollers positioned to receive the same when fruit is delivered to said sizer in the aforesaid direction.

7. A combination as in claim 5 in which the rollers rotated from one side of said sizer are each provided with a sprocket at that side of the sizer which is engaged by an endless chain disposed on said sizer, and in which the balance of said rollers have sprockets on the opposite ends and are rotated by a second endless chain trained about said last mentioned sprockets.

8. In a sizer, the combination of: two groups of transverse rollers disposed in parallel relation, said groups being spaced apart to form a sizing opening; means for rotating the rollers of said groups in a common direction, there being a plurality of rollers in one of said groups and said direction being such that the upper surfaces of the rollers in said group travel toward said sizing opening; means for feeding fruit to be sized onto said last aforementioned group of rollers, said rollers being so proportioned, arranged and driven that the advance of the fruit thereover is dependent upon the incoming fruit crowding fruit already resting on said plural group of rollers to cause said fruit thus crowded to drop into said sizing opening, and where said fruit is too large to pass through said sizing opening to engage said large fruit and press it against the roller on the opposite side of said sizing opening, to cause said fruit to be lifted and transferred in said direction over said last mentioned roller; and means for varying the space between said groups of rollers and changing the range of sizes of fruit admitted through said sizing opening, said rollers continuing to rotate about fixed axes during the operation of said machine in between adjustments as aforesaid, the rollers in said plural group being uniformly spaced substantially close together regardless of the changes in width of said sizing opening.

9. In a sizer, the combination of: two groups of transverse cylindrical rollers disposed in parallel relation, said groups being spaced apart to form a sizing opening between the groups, each of said groups having a plurality of said rollers disposed relatively close together so as to allow no fruit to pass downwardly therebetween; means for rotating said rollers in a common direction to cause the upwardly disposed surfaces of said rollers to move in the same direction in which fruit travels through said sizer; and means for shifting one of said groups of rollers relative to the other group to vary the width of said sizing opening without varying the relative spacing of the rollers within said groups.

10. In a sizer, the combination of: a series of transverse cylindrical rollers disposed in parallel relation substantially in a given plane for rotation about stationary axes; means for rotating said rollers about said axes with their upwardly disposed surfaces traveling in a common direction so that fruit resting on said rollers will be urged over said rollers in said direction by the pressure of incoming fruit, said series being divided into two groups of rollers, said groups being spaced apart to form a sizing opening between the groups, each of said groups having a plurality of said rollers disposed relatively close together so as to allow no fruit to pass downwardly therebetween; and means for shifting one of said groups of rollers relative to the other group substantially parallel with said plane to vary the width of said sizing opening without varying the relative spacing of the rollers within said groups.

11. In a sizer, the combination of: a series of transverse cylindrical rollers disposed in parallel relation substantially in a given plane for rotation about stationary axes; means for rotating said rollers about said axes with their upwardly disposed surfaces traveling in a common direction so that fruit resting on said rollers will be urged over said rollers in said direction by the pressure of incoming fruit, said series being divided into at least three groups of rollers, said groups being spaced apart horizontally to form sizing openings between the respective groups, each of said groups having a plurality of said rollers disposed relatively close together so as to allow no fruit to pass downwardly therebetween; and means for causing relative movement of translation between said groups of rollers to simultaneously vary the width of said sizing openings without varying the relative spacing of the rollers within said groups.

LLOYD E. JONES.